(12) United States Patent  
Smith

(10) Patent No.: US 8,228,209 B2  
(45) Date of Patent: Jul. 24, 2012

(54) SMART METER COVER WITH INTEGRAL UNTETHERED ANTENNA ELEMENTS FOR AMI COMMUNICATIONS

(75) Inventor: Norman James Smith, Santa Rosa, CA (US)

(73) Assignee: RF Savvy LLC, Santa Rosa, CA (US)

( * ) Notice: Subject to any disclaimer, the term of this patent is extended or adjusted under 35 U.S.C. 154(b) by 346 days.

(21) Appl. No.: 12/756,144

(22) Filed: Apr. 7, 2010

(65) Prior Publication Data

US 2010/0253538 A1    Oct. 7, 2010

Related U.S. Application Data

(60) Provisional application No. 61/167,157, filed on Apr. 7, 2009, provisional application No. 61/241,400, filed on Sep. 11, 2009.

(51) Int. Cl.
*G08C 15/06* (2006.01)

(52) U.S. Cl. ............................. 340/870.02; 340/870.03

(58) Field of Classification Search ............. 340/870.02, 340/870.03, 870.28, 870.29; 343/702, 700, 343/872, 793, 895
See application file for complete search history.

(56) References Cited

U.S. PATENT DOCUMENTS

| 6,369,719 | B1 * | 4/2002 | Tracy et al. ............ 340/870.02 |
| 7,196,673 | B2 | 3/2007 | Savage et al. |
| 7,372,373 | B2 | 5/2008 | Borisov et al. |
| 2006/0284784 | A1 | 12/2006 | Smith et al. |
| 2007/0085750 | A1 | 4/2007 | De Angelis |
| 2008/0129536 | A1 | 6/2008 | Randall et al. |

* cited by examiner

*Primary Examiner* — Joseph Lauture

(74) *Attorney, Agent, or Firm* — Craig M. Stainbrook; Stainbrook & Stainbrook, LLP

(57) ABSTRACT

Method and apparatus for mounting and locating untethered embedded antenna elements in the dielectric cover of electric utility meters configured for but not limited to wireless remote one way or two way radio communications for automated metering applications such as remote meter reading, remote connect/disconnect, home area networking, meter equipment firmware downloads, load management or locations based services. A multiplicity of untethered integral antenna elements and topologies may be located within a replacement dielectric cover for a direct-connect cable free or cable connection to a radio or microwave modem. Also described is a method and apparatus for retro-fitting the antenna elements on the inner face of an existing utility meter dielectric cover.

20 Claims, 8 Drawing Sheets

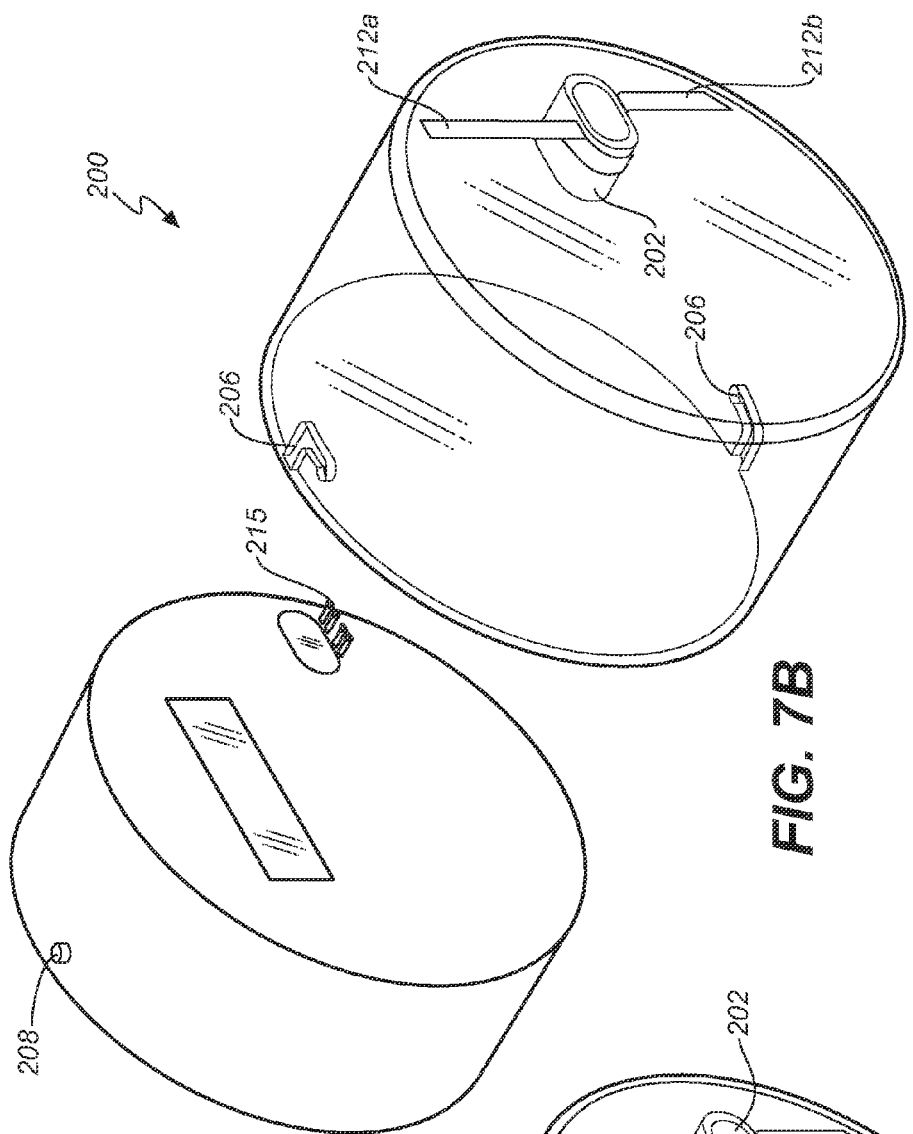
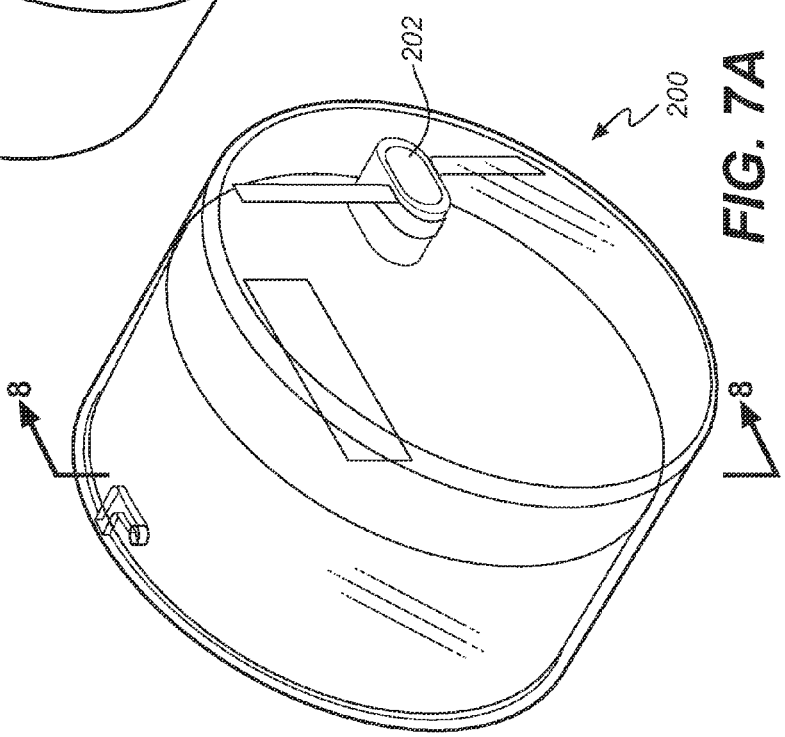
FIG. 7B
FIG. 7A

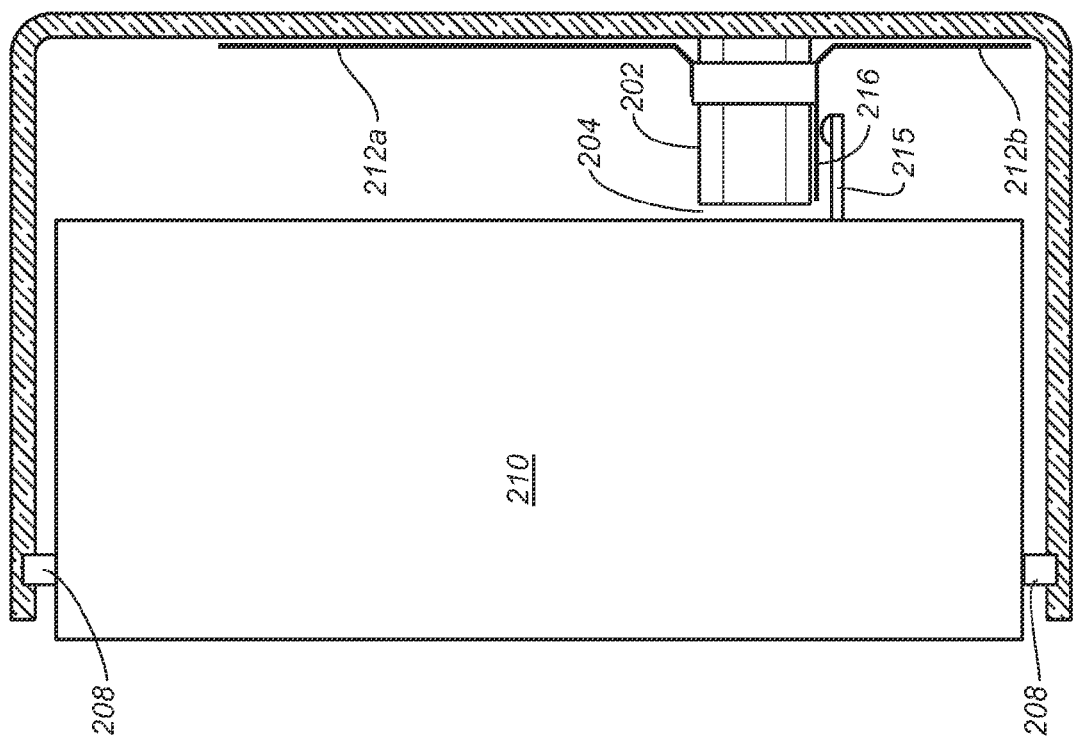
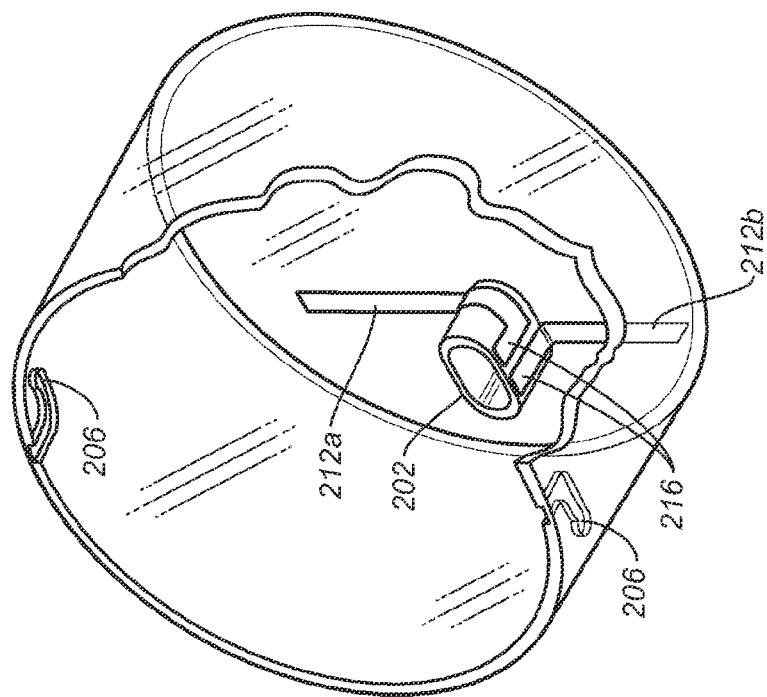

SMART METER COVER WITH INTEGRAL UNTETHERED ANTENNA ELEMENTS FOR AMI COMMUNICATIONS

CROSS REFERENCES TO RELATED APPLICATIONS

The present application claims the benefit of U.S. Provisional Patent Application Ser. Nos. 61/167,157 and 61/241,400, filed Apr. 7, 2009 and Sep. 11, 2009, respectively.

STATEMENT REGARDING FEDERALLY SPONSORED RESEARCH OR DEVELOPMENT

Not applicable.

THE NAMES OR PARTIES TO A JOINT RESEARCH AGREEMENT

Not applicable.

INCORPORATION-BY-REFERENCE OF MATERIAL SUBMITTED ON A COMPACT DISC

Not applicable.

SEQUENCE LISTING

Not applicable.

BACKGROUND OF THE INVENTION

1. Field of the Invention

The present invention relates generally to antennas for utility meters. More specifically the present invention relates to an untethered antenna for use in electricity utility meters configured for but not limited to wireless remote one way or two way communications for automated metering infrastructure (AMI) applications such as remote meter reading, remote connect/disconnect, home area networking, meter equipment firmware downloads, load management or location based services.

2. Discussion of Related Art Including Information Disclosed Under 37 CFR 1.97, 1.98

There are several known antennas adapted for use with electric utility meters configured for wireless remote automated meter reading. Some of the more relevant examples of embedded antennas are discussed below.

U.S. Pat. Appl. Pub. No. 20070085750 teaches traditional methods for locating an embedded antenna within the confines of a dielectric outer housing (the cover) of a utility meter. The system calls for discrete antenna elements with a permanently attached coaxial cable and connector for connecting the antenna to a radio modem. The antenna is mounted under the cover of the utility meter and attached to the inner body of the meter housing using plastic pop-fasteners.

U.S. Pat. Appl. Pub. No. 20060284784 describes a dielectric antenna housing that uses a flexible printed circuit antenna assembly and attaches to the meter body itself, again making use of a coaxial cable and connector to connect the antenna to the radio modem.

Alternative industry approaches are taught, for example, in U.S. Pat. No. 7,372,373, which discloses a slot antenna embedded into the printed circuit board of the meter electronics. However, such embedded antenna designs are taught in other references, such as U.S. Pat. No. 7,196,673, which explains that such designs degrade overall radio frequency system performance due to the proximity of the antennas to the noise sources within the meter.

While it is desirable, for both anti-tamper and vandal-proofing purposes, to mount the antenna within the confines of the utility meter dielectric cover, some references teach a means to optimize the radiating properties and efficiency of the antenna system, and thus improve the over-the-air performance of the system, by locating the antenna as far away as possible from sources of noise generated by the digital electronic meter circuits, and therefore generally as far towards the front of the meter as possible. In this regard, U.S. Pat. Appl. Pub. No. 20080129536 is exemplary.

Other background references, such as U.S. Pat. No. 7,196,673, teach approaches that include building the antenna onto the faceplate of the meter, attached to the meter inner body, in order to accomplish improved system performance.

In each of the aforementioned references there is an obvious effort to maximize the distance between the antenna and the meter electronic circuits, because the meter electronic circuits are a source of noise due to the mutual coupling into the antenna. Therefore, any design that further improves on the distance created between the embedded antenna and the meter electronics, while keeping the antenna within the confines of the utility meter cover, would be an advantage over the known embedded antenna systems and apparatus.

While the foregoing references show the general state of the art, as far as the present inventor is aware, no prior art references teach, nor do any formerly developed embedded utility meter antennas include, structure that comprises untethered antenna elements within the dielectric cover of the utility meter itself. Thus, the foregoing prior art reflect the current state of the art of which the present inventor is aware, but reference to, and discussion of, the art is intended only to aid in discharging Applicant's acknowledged duty of candor in disclosing information that may be relevant to the examination of claims to the present invention. However, it is respectfully submitted that none of the above-indicated prior art disclose, teach, suggest, show, or otherwise render obvious, either singly or when considered in combination, the invention described and claimed herein.

BRIEF SUMMARY OF THE INVENTION

It is a first and principal object of the present invention to provide an improved method for locating embedded antenna designs within the confines of a dielectric cover of an electric utility meter, sometimes referred to as a SMART meter, that has been configured for but not limited to wireless remote one way or two way radio communications for automated metering applications such as remote meter reading, remote connect/disconnect, home area networking, meter equipment firmware downloads, load management or location based services using ISM band mesh networks, wide-area-networks, wireless local-area-networks, private licensed spectrum, GPS satellites, telecommunication satellites or public cellular communication networks.

It is another object of the present invention to address the shortcomings in, and improve upon, the above-described prior art of wireless automated meter reading and automated metering infrastructure embedded antennas by moving the antenna further away from the meter body and mounting a portion of the resonant structure of the antenna on the inside of the front cover of the meter. (As used herein, a "portion of" shall mean either a part of or the whole of the recited structure.) In this placement and configuration the antenna performance is least affected by the noise generated by the meter electronics and minimizes radio frequency coupling back to the radio receiver.

It is another object of the present invention to eliminate the need for the expensive discrete coaxial cable feed and radio or microwave frequency connector between a radio, microwave, or modular connectorized modem and the antenna which several of the above prior arts rely upon.

A further object of the present invention is to provide for a multiplicity of direct-connect and untethered integral antenna elements and topologies, located within the physical confines of a replacement dielectric cover or retrofitted on the inner surface of an existing utility meter dielectric cover. [As used herein, the term "untethered" means that an electrical connection between the antenna and the signal source is either made or broken entirely through the placement or removal, respectively, of the dielectric meter cover, and includes no soldered or permanently attached cable-implemented physical connection between the dielectric cover mounted antenna electrodes and the meter body-side contacts that are part of the antenna feed network.]

Yet another object of the present invention is to provide a method directly applicable to a plurality of communication operating frequencies and standards associated with utility meter wireless remote one way or two way wireless communications.

Another object of the present invention is to provide antenna elements having a portion of the antenna resonant structures permanently formed in the dielectric cover of a utility meter using an insert-mold, molded interconnect or heat staking manufacturing process to create a single piece component that directly replaces the original dielectric cover with one containing integral antenna elements.

Still another object of the present invention is to provide an antenna configuration as in the immediately preceding paragraph in which a replacement dielectric cover material is fabricated from the same material as the original cover or, alternatively, is fabricated from material having a low dielectric constant and low radio or microwave frequency reflective or absorbing material compositions.

Yet another object of the present invention is to provide a method of retro-fitting and locating untethered antenna elements on the inner surface of an existing utility meter dielectric cover.

The foregoing summary broadly sets out the more important features of the present invention so that the detailed description that follows may be better understood, and so that the present contributions to the art may be better appreciated. There are additional features of the invention that will be described in the detailed description of the preferred embodiments of the invention which will form the subject matter of the claims appended hereto.

BRIEF DESCRIPTION OF THE SEVERAL VIEWS OF THE DRAWINGS

The invention will be better understood and objects other than those set forth above will become apparent when consideration is given to the following detailed description thereof. Such description makes reference to the annexed drawings wherein:

FIG. 7A is an upper front left perspective view of a fourth preferred embodiment of the untethered utility meter antenna of the present invention, showing an untethered dipole antenna topology constructed around a meter cover optical coupler port;

FIG. 7B is an exploded view thereof;

FIG. 7C a lower rear left perspective view of the dielectric cover of the fourth preferred embodiment with a portion of the cover cut away to facilitate viewing from underneath and behind the cover;

FIG. 8 is a cross-sectional side view in elevation thereof; and

DETAILED DESCRIPTION OF THE INVENTION

Figure 1:
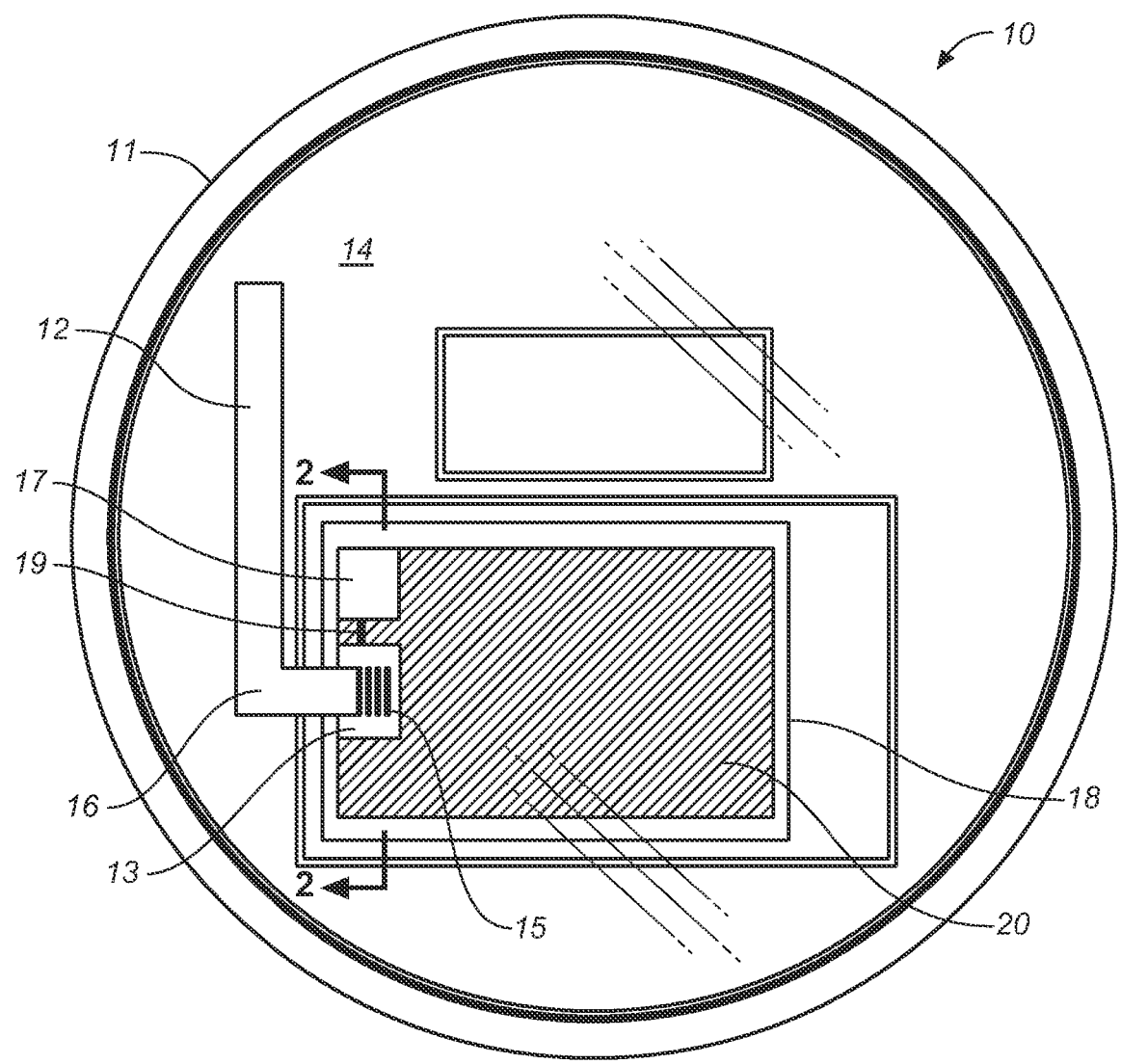
FIG. 1 is a front view in elevation of a first preferred embodiment of the untethered embedded antenna for use with utility meters of the present invention, showing a direct-connect monopole antenna topology.
Figure 2:
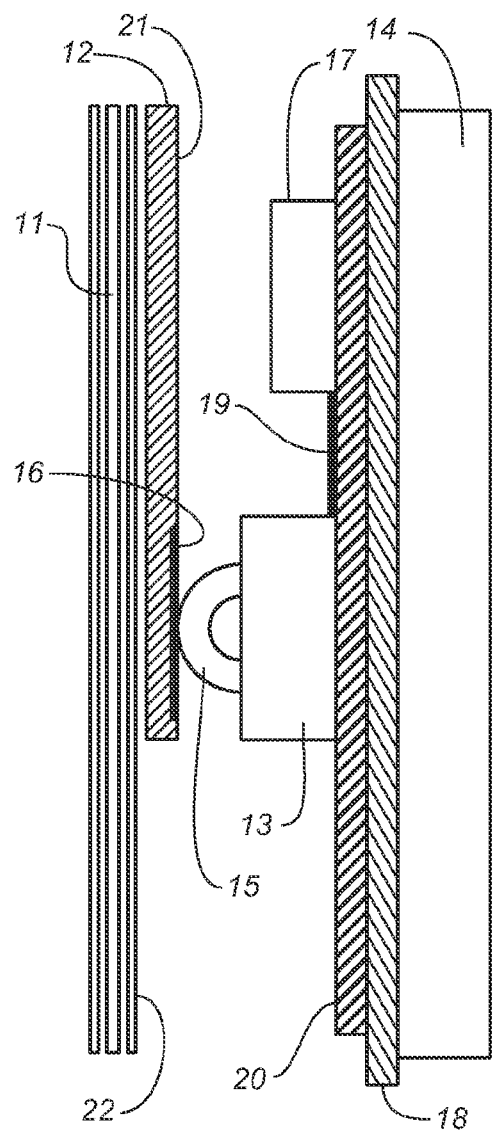
FIG. 2 is a cross sectional side view in elevation thereof taken along section line 2-2 of FIG. 1, showing details of the antenna and meter body electrode connection as well as the direct-connection between the radio modem and the antenna.

Referring first to FIGS. 1 and 2, wherein like reference numerals refer to like components in the various views, there is illustrated therein a new and improved embedded antenna entirely contained within the confines of a dielectric cover of an electric utility meter, the first preferred embodiment of which is generally denominated 10 herein. The inventive apparatus comprises an embedded antenna 12 that enables a multiplicity of untethered integral antenna elements and topologies to be located within and on the inner front cover of a replacement dielectric cover 11 of a utility meter. The structure of the antenna 12 is created by permanently forming the metal stamped antenna elements into the dielectric cover 11 using an insert-mold, molded interconnect, or heat staking manufacturing process to create a single-piece component that directly replaces the original dielectric cover with one containing an antenna 12 having integral antenna elements.

In the first preferred embodiment of the invention, the dielectric cover replaces the cover provided by the original equipment manufacturer. The replacement dielectric cover 11 is preferably fabricated from material identical to that employed in the original specifications. However, in the alternative, if the radio or microwave frequency properties of the original cover are inadequate in any respect—for example, if the dielectric material absorbs too much radio or microwave frequency energy from the antenna—to maintain satisfactory antenna efficiency it may be necessary that the replacement dielectric cover 11 be manufactured from a dielectric material having an effective dielectric constant in the range of 4.5 or less, in addition to containing zero or very low percentage (five percent or less, for instance) of radio or microwave frequency reflective or absorbing material.

Next, the first preferred embodiment of the invention includes a signal source, such as a microwave modem or radio modem 17 connected to the antenna 12 (or an arm of the antenna functioning as an antenna electrode 16) via an antenna lead-in, such as a printed transmission line or feed line 19 and a meter body side spring-loaded contact 15, or alternately a pogo pin (not shown) affixed to the radio modem printed circuit board 18. In this preferred embodiment of the invention there is no discrete coaxial cable connection between the radio modem 17 and the antenna 12.

In another aspect of the first preferred embodiment, the antenna elements may be formed by etching conductive traces into the inner surface of the dielectric meter cover 11 using commercially available processes. This manufacturing method achieves the same desired result; namely, an untethered antenna formed on the meter cover 11.

In yet another embodiment (particularly well-suited to the implementation of the inventive system in a retrofit utility meter cover, and equally well-suited to the prototyping phase of the antenna development) the antenna 12 is cut from and constructed using copper self-adhesive tape foil (such as 3M® Part No. 3M1181B, or a similar product) and applied at the desired location on the inner surface of the meter dielectric cover 11. This enables testing of early designs to ensure conformance with target electrical specifications prior to implementing final re-tooling for commercial manufacture. This provides an economical proof-of-concept development process. [3M is a registered trademark of 3M Company, St. Paul, Minn.]

As an example, when antenna 12 is a monopole arm antenna, calculated to be one quarter wavelength long in free space, the actual length of the monopole arm may need to be shortened once placed onto the dielectric cover 11 of the meter for the antenna to resonate at the specified operating frequency. Thus, the above-described method of prototyping readily facilitates an economical way to identify and optimize monopole arm length until the resonant frequency of the antenna is aligned with the target operating frequency of the antenna.

In accordance with one aspect of the first preferred embodiment, the integral untethered antenna element can be created to form one arm of an unbalanced monopole 12 with the arm approximating a quarter wavelength long and arranged within the meter dielectric cover 11 facing inwards, and making electrical connection to as follows:

The monopole arm 12 is fabricated with a stamped metal tooling and inserted into a replacement dielectric cover 11 of the utility meter by means of an insert molding manufacturing technique. The antenna element 12 is substantially incorporated into the front face of the dielectric cover 11 of the meter leaving only a portion of the monopole arm exposed. The exposed portion serves as an antenna electrode 16 or contact point for the corresponding meter body side spring-loaded contact 15.

In another aspect, during the manufacturing process the antenna element 12 is placed on the inside front cover of the meter 11 and positioned vertically on the meter cover 11 such that the arm is pointing substantially vertically (to the 12 o'clock position) on the face of the meter 14 while the ground plane 20 is generally to the right and below the antenna element 12 (when viewed from the front) and is thus positioned to create a vertically polarized radiation pattern from the antenna element. In other possible aspects, a design engineer may choose to re-position the antenna or a plurality of antennas located on the front cover or around the circumference of the meter cover in order to optimize the desired radiation patterns, polarization or performance of these antennas.

According to another of the several objects of the invention, the untethered antenna element 12 integral to the dielectric cover 11 has no need of a physical cable connecting the antenna to the radio or microwave modem, 17. The following antenna element electrode contact 16 methods are therefore provided.

In one aspect of the first preferred embodiment, and referring now to FIG. 2, the antenna electrode 16 is positioned on, and extends from, a lower portion of the antenna 12 and is aligned so as to make a direct electrical connection to a spring-loaded contact 15 of a surface mounted electrode 13 located and facing perpendicular outwards from the body of the meter face 14. The spring-loaded contact 15 extends outwardly from the mounted electrode 13 and thus protrudes from the meter face 14 by several millimeters. It is aligned purposefully to strike the corresponding antenna electrode 16 when the meter cover 11 is fully locked into position onto the meter base during normal operation of the meter in the field.

Figure 3:
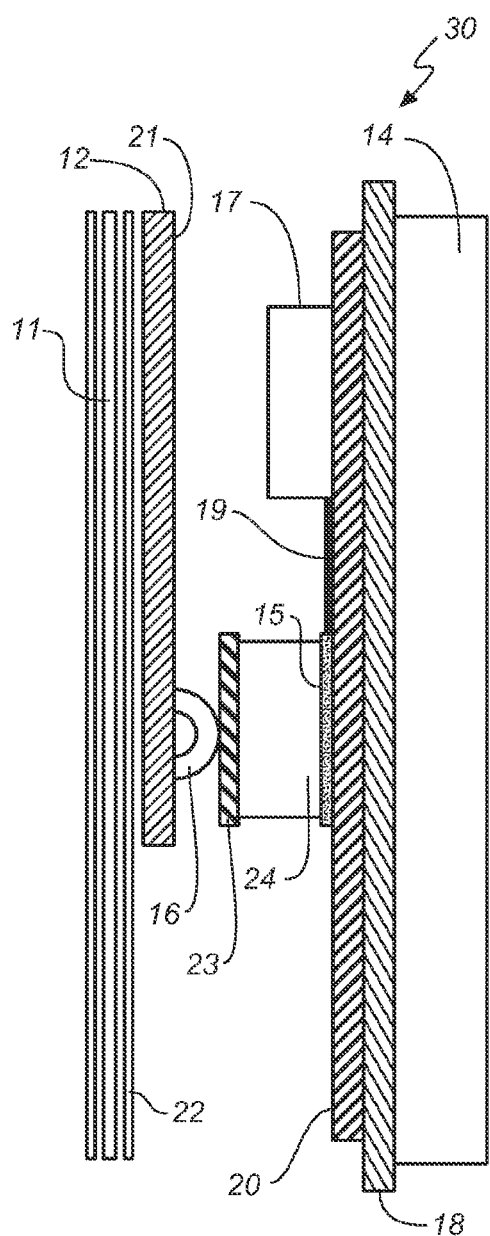
FIG. 3 is a cross sectional side view in elevation thereof taken along the same section lines as that of FIG. 2, but shows a second preferred embodiment of the present invention in which the meter body electrode is aligned for capacitive coupling to the antenna electrode.

In another embodiment of the present invention 30, and referring now to FIG. 3, the antenna electrode 16 can be positioned on the inner surface 21 of the antenna or made coplanar with the antenna inner surface and the antenna, in turn, can be mounted on the inner surface 22 of the front face of the dielectric cover or integrated into the meter dielectric cover 11. However, the antenna electrode 16 is configured to be purposefully spaced apart from, and thus not to make a direct electrical connection to, an opposing meter body electrode 15 that is connected to the transmission line 19 and insulated with dielectric material, such as insulating tape 24. The meter body electrode 15 is positioned to face in an outward orientation from the utility meter face plate 14. However, in this arrangement, rather than providing an inductive connection between the antenna electrode 16 and the meter body electrode 15, the meter body electrode 15 is aligned and configured to provide a capacitive coupling by means of the gap created by the arrangement of a parallel capacitive electrode plate 23, the dielectric insulating medium 24, such as insulating tape, interposed between the meter body electrode 15 and the antenna electrode 16 when the meter cover 11 is fully locked into position onto the meter base during normal operation of the meter. As will be appreciated, the wider the gap or the thickness of the dielectric medium 24 between the parallel capacitive electrode plate 23 and the meter body electrode 15, the greater the capacitance between them according to well known principles of parallel plate capacitance. Thus, the final antenna element length 12 and resulting impedance tuning will need to be modified to compensate for the series capacitive reactance introduced into the antenna feed network due to the inherent and necessary dielectric gap 24 that this embodiment dictates. The purpose of the electrical insulation 24 over the meter body electrode 15 on the meter body side is to comply with regulatory safety standards and to prevent electric shock from the otherwise exposed meter body side electrodes 15 should the meter dielectric cover 11 be removed during normal operation of the meter in the field.

In yet another aspect, referring and shown schematically now in FIG. 2, antenna electrodes mounted on the dielectric meter cover can be stimulated via dielectric ceramic pellets made from a high-Q (low dielectric loss) resonator material. This provides an alternative means of an untethered connection between the antenna electrodes 16 located on the meter cover 11 and the meter body side pick up electrodes 13. In this aspect, the dielectric resonator material is substituted for the metallic spring loaded contact 15 in the aforementioned embodiments.

In the case of the first and second preferred embodiment, the meter body electrode 15 and parallel capacitive plate 23, respectively, forms the signal feed point, and the ground plane 20 is provided by the conductive surface of the radio modem printed circuit board 18. The meter body electrode 15 is connected via a transmission line 19 printed on the radio or microwave modem circuit board 18 and optimally matched in impedance between the antenna element 12 and spring meter body electrode 15 for the purpose of connecting it to the radio or microwave modem 17 connection. The printed transmission line 19 may have an impedance matched to the specified impedance of the radio or microwave modem 17, for example 50 ohms, using micro-strip, strip-line, co-planar, or other printed transmission line techniques.

As will be appreciated, and referring back now to FIGS. 1 and 2, in operation, once the meter cover 11 is locked into position the radio or microwave frequency electromagnetic energy that flows from the radio or microwave modem 17 can be transmitted and received via the printed transmission line, 19, and the meter body electrode 15 that will be physically touching down onto the antenna electrode 16 on the inside of the face of the meter cover 11 when fully assembled. This connection enables current to flow in opposing directions in the antenna arm 12, and ground plane 20, stimulating magnetic and electric field currents in the arm 12 and ground plane 20 thereby creating a vertically polarized largely omni-directional radiation pattern and hence a successful transmission and reception of radio signals to and from the utility meter to the network with which the radio or microwave modem 17 and antenna 12 have been designed to interface.

Figure 4:
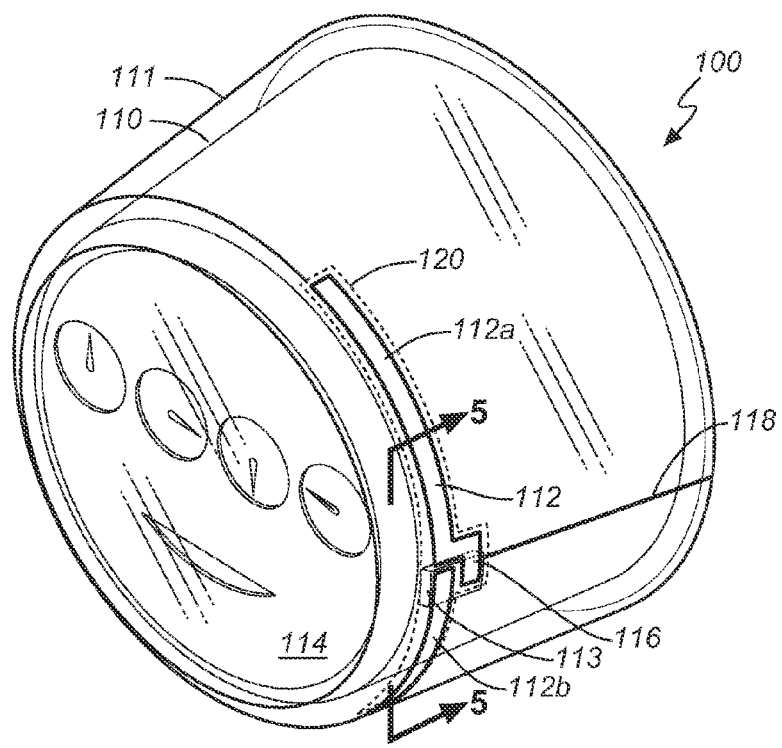
FIG. 4 is an upper right front perspective view of a third preferred embodiment of the inventive antenna system, showing the use of an untethered dipole antenna topology.
Figure 5:
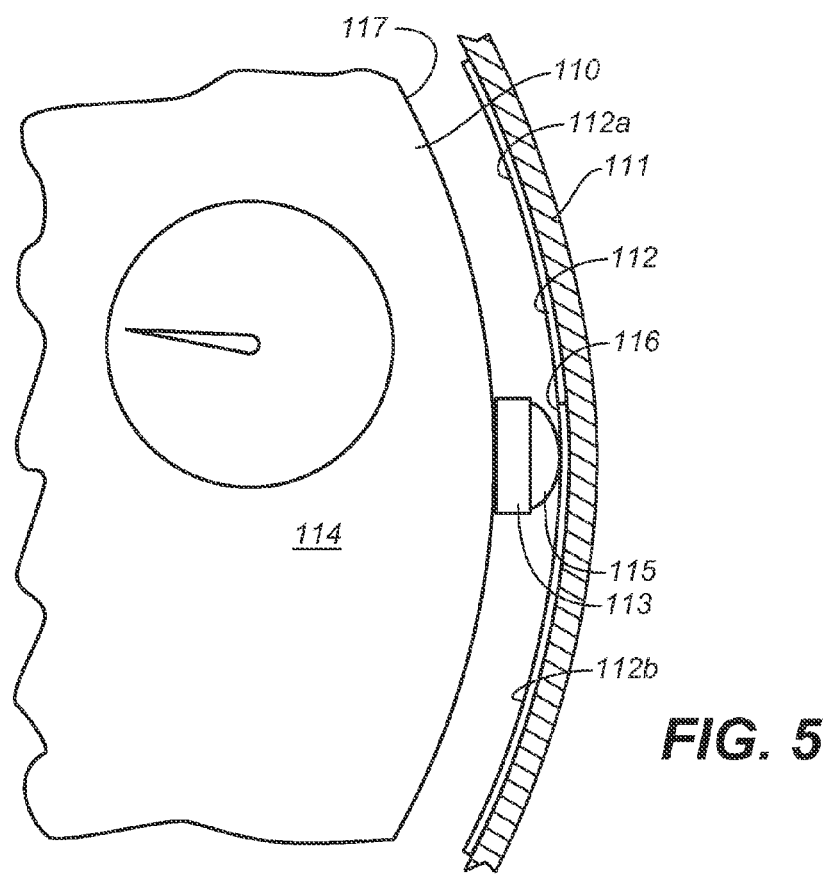
FIG. 5 is a detailed cross-sectional front view in elevation taken along section line 5-5 of FIG. 4.
Figure 6:
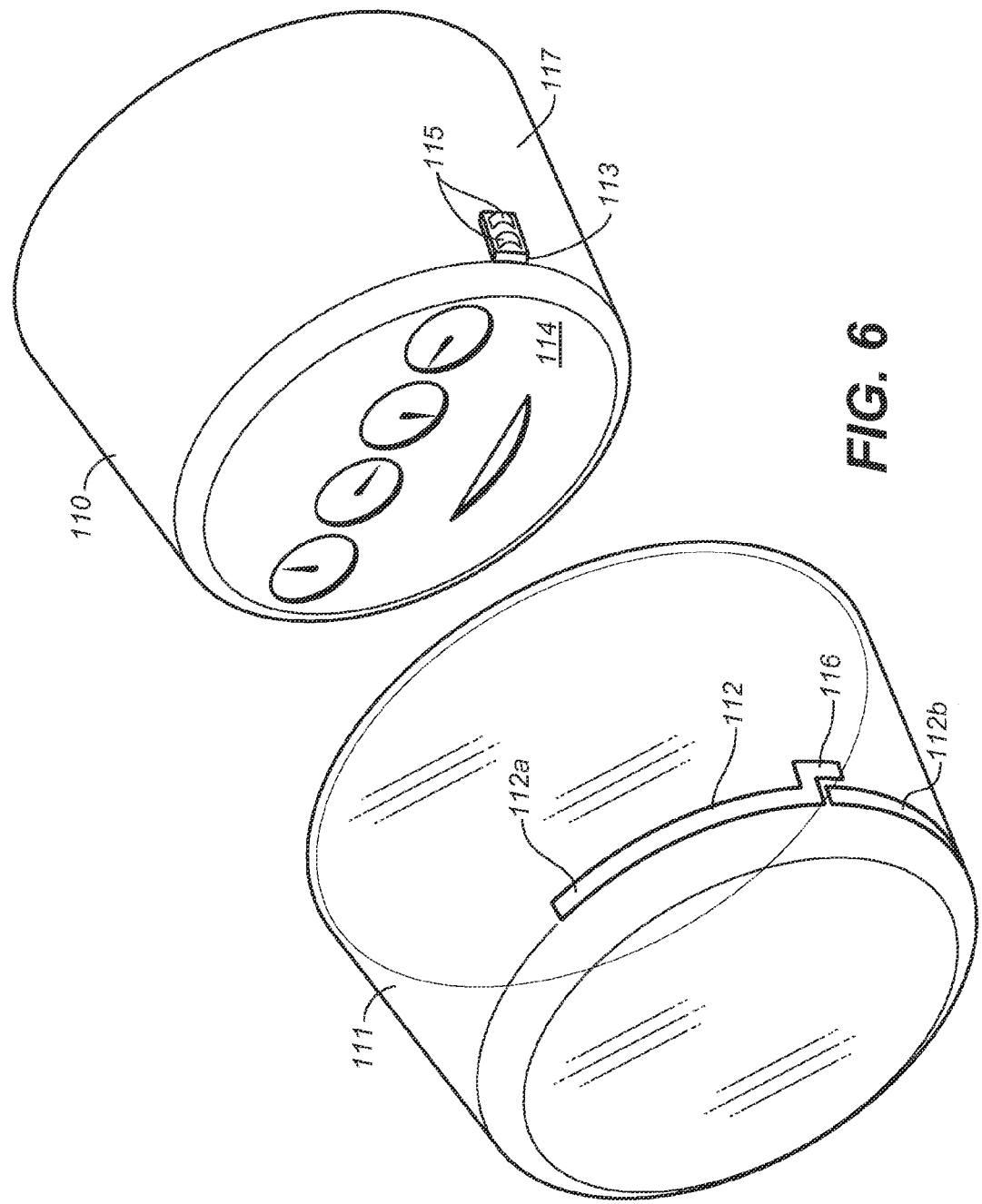
FIG. 6 is an exploded upper right front perspective view of the apparatus of FIGS. 4-5.

Referring next to FIGS. 4-6, there is shown a third preferred embodiment 100 of the embedded untethered antenna of the present invention. In this embodiment, the antenna structure 112 is also created by permanently forming the metal stamped antenna elements into the front portion of the cylindrical sidewall of the dielectric cover 111 using an insert-mold, molded interconnect, or heat staking manufacturing process to create a single piece component that directly replaces the original dielectric cover with one containing integral untethered antenna elements 112. Once again, the replacement dielectric cover 111 may be the same as that specified by the original manufacturer or may be modified to optimize and enhance antenna performance.

As may be appreciated, in either antenna configuration described in the above embodiments, the inventive untethered embedded antenna need not be physically incorporated into the dielectric meter cover material and can be implemented by retro-fitting the antenna elements onto the inside face of an existing utility meter dielectric cover 11, 111, with a conformal antenna 12, 112, such as a monopole, dipole, or other well known antenna topology, to achieve the same objects and advantages of the fully integrated, untethered embedded antenna embodiment. One example of this aspect of the invention can be accomplished by retro-fitting antenna elements to the interior side of the meter dielectric cover near the front face of the cover using a conformal printed antenna monopole on a thin flexible dielectric printed circuit board with a dielectric constant in the range of 4.0, or other flexible suitable radio or microwave frequency compatible dielectric material, and then attaching it with an industrial strength adhesive tape or glue. While this may not be the easiest method of manufacturing the inventive system or for providing a durable structure, it serves as a means of retro-fitting the invention into an existing cover in limited production quantities until the above-described preferred embodiment can be implemented by tooling the meter cover molding tool to permanently accommodate the integral untethered antenna element in the desired utility meter application.

An exemplary retro-fit design is also shown in FIG. 4, wherein the antenna elements are affixed to the interior side of the meter dielectric cover by constructing a conformal printed antenna dipole 112 on thin flexible printed circuit board 120 (depicted in dotted lines to illustrate this as an optional mounting technique). The printed circuit board has a dielectric constant in the range of 4.0. Other flexible suitable radio frequency compatible dielectric material may be used. The antenna is attaching using a strong adhesive tape or glue (not shown). The integral antenna elements are created to form two arms 112a, 112b, of a balanced dipole 112 with each arm approximating a quarter wavelength long and arranged within the meter dielectric cover 111 to face inwards.

In another aspect of the embedded implementation of this configuration, the dipole arms 112 are fabricated with a stamped metal tooling and inserted into a replacement dielectric cover of the utility meter using an insert molding manufacturing technique. Thus, the antenna elements are substantially incorporated into the dielectric cover 111 of the meter, leaving exposed only a portion of each of the dipole arms to serve as antenna electrodes 116 or contact points for the corresponding meter body side spring-loaded electrodes 115.

One way of orienting the antenna elements 112 in either the embedded or retrofit aspects of this sidewall configuration is to place them at a substantially 3 o'clock position when viewing the front of the meter 114. The antenna elements are positioned on the cylindrical sidewall of the meter cover and towards the front portion of the meter cover such that one dipole arm 112a extends upwardly toward the 12 o'clock position and the other arm 112b extends downwardly toward the 6 o'clock position, and thereby creates a vertically polarized radiation pattern. The antenna elements may be repositioned (or a plurality of antennas, such as in a MIMO antenna array, may be located) around the circumference of the meter cover in order to optimize the desired radiation patterns, polarization, or performance of these antennas.

Next, the antenna electrodes 116 are positioned and aligned on the inner surface of the meter dielectric cover 111 such that they make a direct connection to a pair of spring-loaded surface mount contacts 115 located on and facing outwards from the side 117 of the body of the meter. The meter body side spring-loaded contacts 115 protrude from the meter body side by several millimeters and are aligned to contact the corresponding antenna electrodes 116 when the meter cover 111 is fully locked into position onto the meter base.

Figures 5A, 5B:
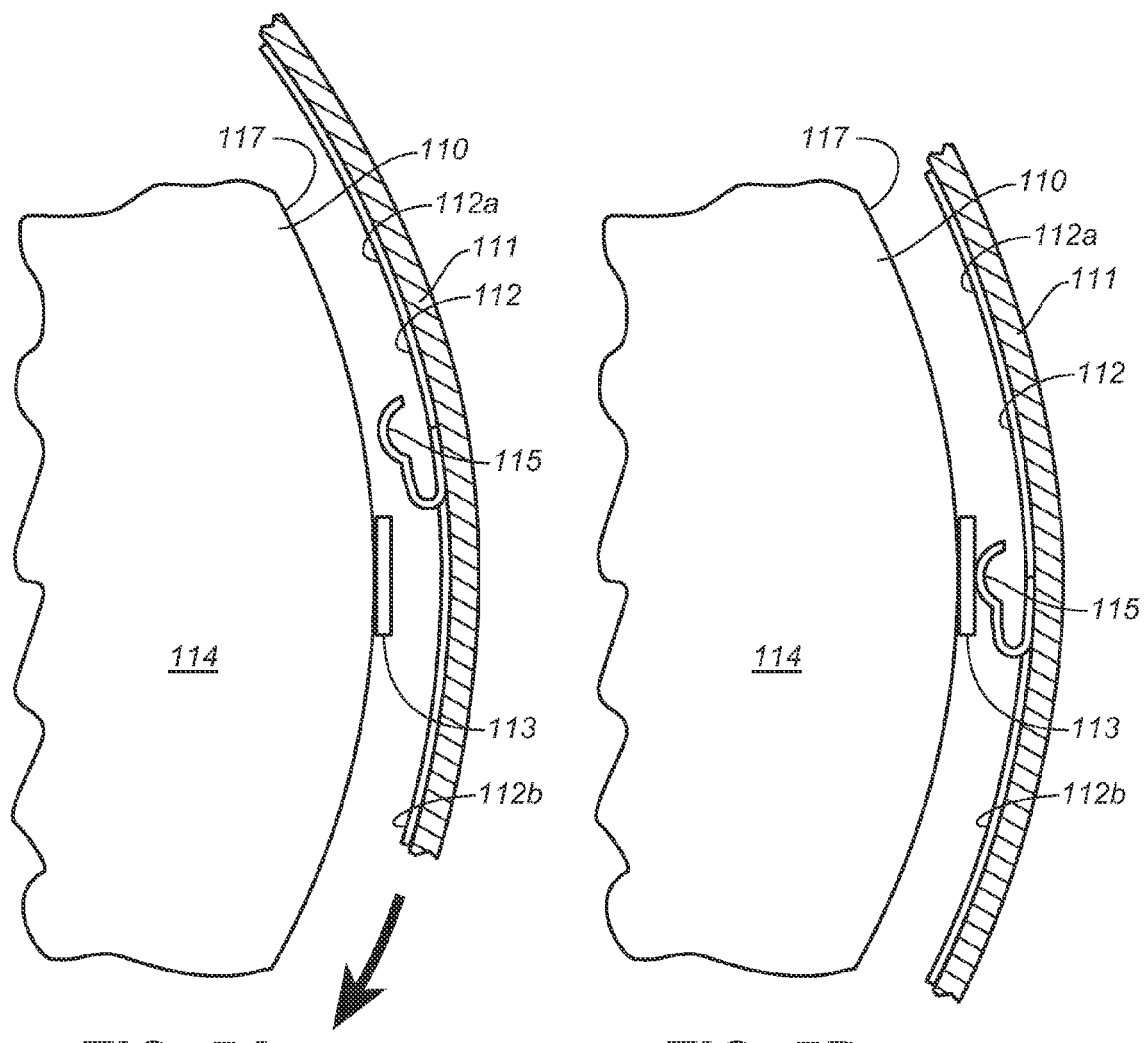
FIG. 5A is a schematic view showing another preferred embodiment of the present inventive antenna system using a spring contact coupling between the meter body side electrodes and the antenna electrodes, where the antenna spring contact electrodes are formed as part of the antenna structure on the meter cover, this view showing the components in an uncoupled position, where the dielectric meter cover is not fully locked into the closed position.
FIG. 5B shows the same embodiment of FIG. 5A with the spring contact coupling effected by placement of the dielectric meter cover, such that it is fully locked into the closed position, on the utility meter body.

As with the above-described embodiment, referring now to FIGS. 5A and 5B, the antenna electrodes in this embodiment may be positioned and aligned on the inner surface of the meter dielectric cover such that they make a direct physical connection to the opposing meter body electrodes. As an example, finger-type spring loaded electrodes 115 disposed on the antenna electrodes extend inwardly from the interior surface of the dielectric cover. In this configuration, the meter body electrodes 113, are disposed on the meter body dielectric medium 117 and are connected to a printed transmission line (not shown) or alternately coaxial cable (not shown) which is connected to the radio modem (not shown). Accordingly, placement of the meter cover on the meter body creates a direct spring contact electrical connection between the antenna 112 and the meter body electrode 113 when the meter cover is locked into position onto the meter body [see FIG. 5B].

In this embodiment, the direct spring-loaded contacts 115 located on the side 117 of the meter body 114 are formed as part of the antenna elements 112 on the meter cover 111 and are shaped to form a spring curvature that bridges the air gap reaching across to and touching down on corresponding metallic meter body side electrodes 113 aligned with the meter cover side spring contacts 115.

The meter body side electrodes 113 may be connected via a micro-coaxial connector or alternately soldered to a suitable length of micro-coaxial cable 118, which in turn is terminated with a commercial radio or microwave frequency connector (not shown) at its opposite end for the purpose of connecting it to the radio or microwave modem connector located within the body of the meter housing 110.

Since the exemplary third preferred embodiment is a balanced dipole antenna 112, and since a typical radio or microwave modem will require a single ended 50 Ohm impedance connection, this embodiment includes in its construction a quarter wave length shorted BALUN device (not shown but well understood), constructed from a single core copper wire insulated with a plastic sheath. The two ends of the BALUN wire are soldered between the surface mount contact 113 of the spring-loaded connector 115 signal connection and a point along the micro-coaxial cable attached to the shielding. This point is selected to be a distance of one quarter wavelength away from the signal connection at the center frequency of operation for the antenna. The effect of the BALUN is to cancel out the opposing currents that flow in each arm 112a, 112b of the antenna that—in an imperfect embedded antenna environment such as utility meters—can lead to undesirable currents flowing in the coaxial cable shield and result in efficiency degradation of the antenna radiated performance.

In operation, referring now to FIGS. 4 and 5, once the meter cover 111 is locked into position the radio or microwave frequency energy that flows from the radio or microwave modem can be transmitted and received via the antenna feed network comprising the micro-coaxial cable (not shown) and the spring-loaded electrodes 115 that will be physically touching down onto the antenna electrodes 116 on the inside of the meter cover when fully assembled. This connection enables current to flow in opposing directions in each of the antenna arms 112a, 112b stimulating magnetic and electric field currents in the vicinity of the dipole arms and create a vertically polarized largely omni-directional radiation pattern and hence a successful transmission and reception of radio or microwave signals to and from the utility meter to the network with which the radio or microwave modem and antenna have been designed to interface.

In still another aspect of this configuration, referring schematically to FIGS. 5A and 5B, the antenna electrodes mounted on the dielectric housing meter cover can be stimulated via ceramic dielectric resonating pellets, thus providing an alternative means of an untethered connection between the antenna electrodes 115 located on the meter cover 111 and the meter body electrodes 113. In this example embodiment the dielectric resonator material replaces the meter body electrodes 113 in the aforementioned embodiments.

In yet another embodiment 200 of the untethered utility meter cover antenna of the present invention, shown in FIGS. 7A through 8, a dipole antenna 212 with an upper arm 212a and lower arm 212b, and having trace element contacts wrapped around an optical coupler port (light pipe) 202 with antenna electrode contacts 216 that connect to spring arm contacts 215 disposed on the front of the meter body so as to bridge the gap 204 that exists between the cover face and meter body 210 on some types of meters. When the female bayonet grooves 206 in the meter cover engage the male pins 208 of the meter body and the cover is turned into a locked position, the light pipe is translated radially into position such that the antenna electrodes 216 of each of the upper and lower arms are brought into contact with the spring arm contacts 215. Once again, different antenna types and topologies may be employed using the meter cover having an optical coupler port. Discussion of a dipole antenna is for illustrative purposes only.

Additionally, it will be appreciated that the meter covers shown herein are simplified and schematic and thus do not show apparatus customarily used for locking the meter cover in place, such as a sealing collar with a tamper proof seal.

Figure 9:
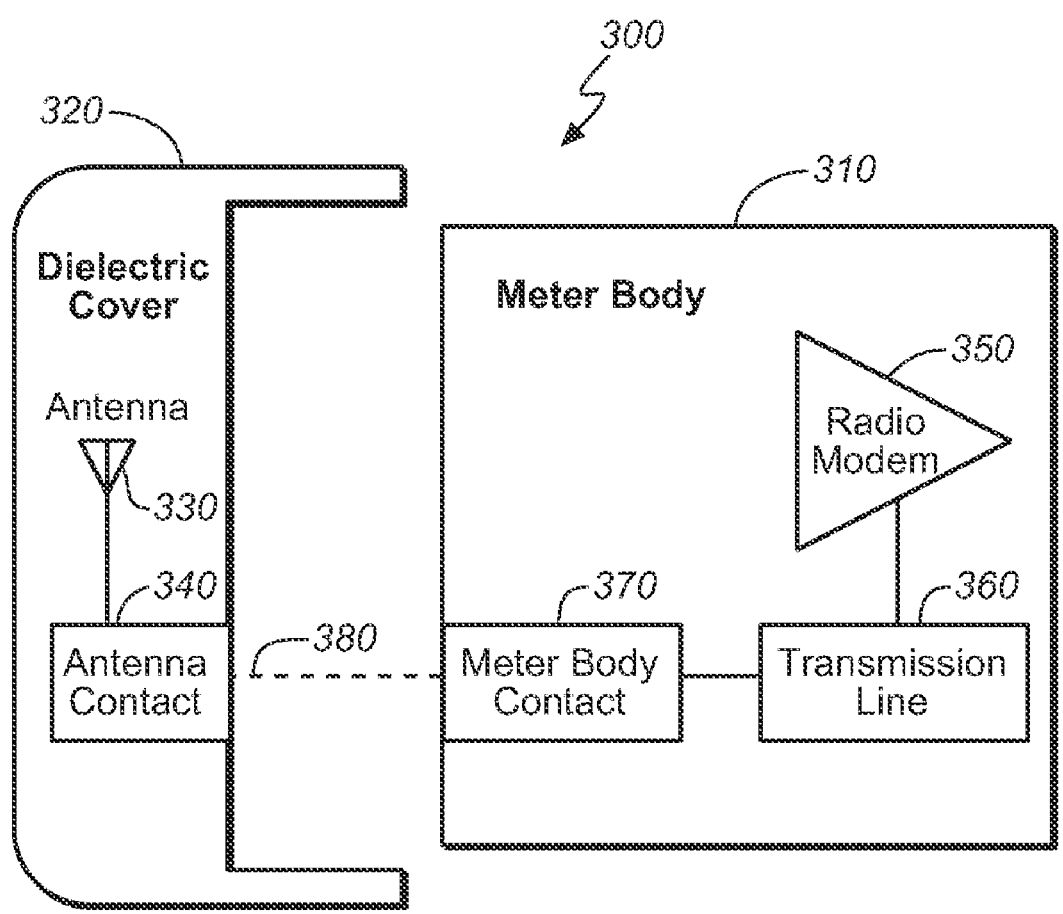
FIG. 9 is a schematic block diagram showing the most essential elements of the inventive untethered antenna assembly.

From the foregoing, referring now to FIG. 9, it will be appreciated that in its most essential aspect, the present invention is an untethered antenna assembly 300 integral to a utility meter dielectric cover for use in radio or microwave communications systems with water, gas, or electric utility metering devices that includes a meter body 310 and a dielectric cover 320. The assembly includes at least one antenna 330 substantially incorporated into or disposed on an interior wall of the dielectric cover. The antenna includes an exposed portion for use as an antenna contact or electrode 340. These first elements constitute the cover side of the assembly. The dielectric cover 320 is, of course, removable from the meter body 310, and is not in any way tethered to the body through wires, whether cable conductors are used or not.

On the meter body side of the inventive apparatus, the operative elements of the system include a radio or microwave modem 350 electrically connected by a transmission line 360 to a meter body surface mount contact or meter body electrode 370, the meter body electrode being physically mounted on the utility meter body 310. The meter body electrode 370 and the antenna electrode 340 are connected to one another through a direct electrical or electromagnetic coupling of the meter body electrode with the antenna electrode, but only when the dielectric cover is installed on the meter body and put into a locked configuration. Thus, an electrical or electromagnetic connection between the antenna and the radio or microwave modem is made entirely and only through the placement of the dielectric meter cover on the meter body and the distance 380 between the dielectric cover of the utility meter and the meter body is sufficiently reduced, and the same electrical or electromagnetic connection is broken by the removal of the dielectric cover from the meter body. Because of this configuration, the need for a soldered or permanent cable-implemented physical connection between the antenna electrode and the meter body electrode is obviated.

The schematic view of FIG. 9 also shows that the present invention includes a method of providing an untethered antenna assembly for use in AMI communications systems with water, gas, or electric utility metering devices, the method including the steps of: (a) locating and installing a radio or microwave modem on or within a utility meter body; (b) mounting a meter body electrode in the utility meter body; (c) electrically connecting the radio or microwave modem to the meter body electrode using a transmission line; (d) providing a dielectric meter body cover; (e) installing an antenna assembly in the meter dielectric cover either by substantially incorporating it into an interior wall of the meter dielectric cover or disposing it on an interior wall of the meter dielectric cover, and so fashioning the antenna to provide an exposed portion for use as an antenna electrode, wherein the meter body electrode and the antenna electrode are so oriented and configured that an electrical or electromagnetic coupling between the electrodes is effected only when the dielectric cover of the utility meter is installed and put into a locked configuration, thus, an electrical or electromagnetic connection between the antenna and the radio or microwave modem is made entirely and only through the placement of the dielectric meter cover on the meter body, and wherein the same electrical or electromagnetic connection is broken by the removal of the dielectric cover from the meter body.

While some of the specific antenna examples provided above describe a monopole topology, thus calling for one electrode in the unbalanced antenna topology, other radio frequency or microwave antenna types and system topologies may be employed to implement the inventive concept. For instance, the inventive untethered antenna system (whether embedded or applied on the interior side of the dielectric cover) may employ inverted F structures, planar inverted F structures, folded inverted conformal structures, dipoles, MIMO arrays (as well as other configurations commonly used in SMART antenna systems), and other radio frequency (RF) or microwave frequency antenna types requiring several electrode feeding points and corresponding contact sets to allow proper signal pin and ground pin connections to stimulate and excite the antenna structure, such as would be employed for a normal tethered antenna approach. Indeed, the use of an untethered meter cover mounted MIMO antenna design may be particularly advantageous in the intended field of use, as the very nature of AMI systems used for wireless remote meter reading is that they are often deployed in a multi-path rich environment. The particular form of antenna diversity utilized in a MIMO design is not critical; that is, the method of diversifying the antennas may use spatial diversity, pattern diversity, or polarization diversity or a combination of one or more of these arrangements. An example would be for the meter antenna to have orthogonal polarization achieved through positioning one antenna in a perpendicular orientation with respect to another. Handheld, mobile, or fixed network receivers for capturing meter readings may be provided with complementary multiple antennas to effect the full benefits of a MIMO system.

Accordingly, it will be understood that the exclusion of such alternative topologies in the detailed description shall not detract from the principal object and spirit of this invention, and all possible permutations and combinations shall be fully included as if they were specifically called out and referenced in the descriptions and drawings.

While the foregoing description includes specific details, these should not be construed as limitations on the scope of the invention, but as exemplary of the preferred embodiments thereof Variations are possible within the teachings of the various embodiments. For example, while the principal object of the invention, attached figures, and descriptions show cylindrical electric utility meters, one with ordinary skill in the art will be able to appreciate after reviewing the drawings and descriptions that the invention can be readily applied to all shapes and manner of utility meter designs and retrofit solutions, including applications in the water meter and gas meter wireless remote reading markets. This includes, but is not limited to, oval, square rectangular and other shapes that are now or may become available to the market in the future. Likewise, while the principal object of the invention is electric utility meters, the approach of mounting an untethered antenna to the cover of the device, and connecting from a meter body electrode with a physical cable or printed transmission line to the radio or microwave modem printed circuit board, can be similarly applied to devices operating and designed for Home Area Network (HAN) devices closely associated with SMART grids and SMART meter reading applications. Such HAN devices currently include wireless in-home displays, electric water heater wireless remote connect/disconnect modules, wireless HVAC/heating thermostat controls, etc. Thus, the scope of the invention should be determined by its pending claims and their legal equivalents, and not solely by the examples set out herein.

What is claimed as invention is:

1. An untethered antenna assembly integral to a utility meter dielectric cover for use in wireless communications systems with water, gas, or electric utility metering devices that include a meter body and a dielectric cover, said assembly comprising:
   at least one antenna having a portion of its resonant structure substantially incorporated into or disposed on an interior wall of the dielectric cover, each of said at least one antennas including a portion exposed for use as an antenna electrode;
   at least one meter body electrode mounted on the utility meter body for connection to a signal source via an antenna feed network; and
   a surface mount contact disposed on each of either of said at least one meter body electrode or said at least one antenna electrode, wherein each of said meter body electrodes and said antenna electrodes are electromagnetically connected to one another through electromagnetic coupling of said surface mount contact with either of said antenna electrode or said meter body electrode when the dielectric cover of the utility meter is installed and in a locked configuration;
   wherein an electromagnetic connection between said at least one antenna and said signal source is made entirely through the placement of the dielectric meter cover on the meter body, and the same electromagnetic connection is broken by the removal of the dielectric cover from the meter body, such that said at least one antenna and said antenna feed network includes no soldered or permanent cable-implemented physical connection between said antenna electrode and said meter body electrode.

2. The antenna assembly of claim 1, wherein at least one of said at least one meter body electrodes comprises a spring-loaded electrode.

3. The antenna assembly of claim 1, wherein either of said at least one of said meter body electrodes or said at least one antenna electrodes is a pogo pin.

4. The antenna assembly of claim 1, wherein said antenna feed network includes a printed transmission line.

5. The antenna assembly of claim 1, wherein said signal source is selected from the group consisting of a printed circuit board radio modem, and a printed circuit board microwave modem.

6. The antenna assembly of claim 1, wherein said antenna is a monopole antenna having its arm disposed on the inside surface of the dielectric cover and the antenna ground plane is disposed on the signal source.

7. The antenna assembly of claim 6, wherein said surface mount contact and said antenna electrode are electromagnetically coupled through physical contact with one another.

8. The antenna assembly of claim 6, wherein said at least one of said surface mount contacts is a meter body electrode substantially covered with insulating material, and wherein said meter body electrode and said antenna electrode are in a spaced-apart relationship to one another when the dielectric cover is installed on the utility meter and in a locked configuration so as to define a dielectric insulating gap and to couple said at least one meter body electrode and said antenna electrode with a capacitive coupling.

9. The antenna assembly of claim 1, wherein said surface mount contact and said at least one antenna electrode are electromagnetically coupled through physical contact with one another.

10. The antenna assembly of claim 1, wherein said surface mount contact comprises dielectric ceramic pellets.

11. The antenna assembly of claim 1, wherein said surface mount contact is a spring-loaded contact located on said radio modem printed circuit board.

12. The antenna assembly of claim 11, wherein said spring-loaded contact is formed as part of the antenna element on the dielectric cover and includes a spring curvature that engages said transmission line on said radio modem printed circuit board.

13. The antenna assembly of claim 1, wherein said antenna comprises at least one antenna system.

14. The antenna assembly of claim 1, wherein said antenna system includes multiple antennas.

15. The antenna assembly of claim 1, wherein said untethered antenna is retrofitted to an existing utility meter dielectric cover by means other than by substantially incorporating it into a replacement dielectric cover.

16. The antenna assembly of claim 1, wherein said untethered antenna is substantially constructed around an optical coupler light pipe in the meter cover to facilitate bridging the air gap between the meter body and the inner face of the meter cover.

17. An untethered AMI communications antenna assembly for use in utility meters having a meter body and an antenna feed network connected to a signal source, said antenna assembly comprising:
 a dielectric cover;
 at least one antenna having a portion of its resonant structure substantially incorporated into or disposed on an interior wall of said dielectric cover, each of said at least one antennas including an exposed antenna electrode; and
 at least one meter body electrode disposed on the surface of the meter body;
 wherein said meter body electrode and said antenna electrode are electrically connected to one another through an electromagnetic coupling of said at least one meter body electrode with said antenna electrode only when said dielectric cover is installed on the meter body and put into a locked configuration, such that an electromagnetic connection between said at least one antenna and the antenna feed network is made entirely and only through the placement of said dielectric meter cover on said meter body, and the same electromagnetic connection is broken by the removal of said dielectric cover from said meter body, thereby obviating the need for a soldered or permanent cable-implemented physical connection between said at least one antenna electrode and said at least one meter body electrode.

18. The antenna assembly of claim 17, wherein placement of said dielectric cover on the meter body creates a physical connection between said at least one antenna electrode and said at least one meter body electrode, thus creating an inductive coupling.

19. The antenna assembly of claim 17, further including dielectric material disposed between said at least one antenna electrode and said at least one meter body electrode, thereby creating a capacitive coupling between said at least one antenna electrode and said meter body electrode.

20. A method of providing an untethered antenna assembly for use in AMI communications systems with water, gas, or electric utility metering devices having a utility meter body and a signal source, said method including the steps of:
 (a) locating and installing an antenna feed network on the utility meter body;
 (b) mounting a meter body electrode on the utility meter body;
 (c) electrically connecting the signal source to the meter body electrode using an antenna lead-in;
 (d) providing a dielectric meter cover;
 (e) installing an antenna assembly in the dielectric meter cover either by substantially incorporating a portion of its resonant structure in an interior wall of the dielectric meter cover or by disposing a portion of its resonant structure on an interior wall of the dielectric meter cover, wherein the antenna assembly includes an exposed portion for use as an antenna electrode; and
 (f) configuring and orienting the meter body electrode and the antenna electrode such that an electromagnetic coupling between the meter body electrode and the antenna electrode is effected only when the dielectric cover of the utility meter is installed and put into a locked configuration, and thus an electromagnetic connection between the antenna and the signal source is made entirely and only through the placement of the dielectric meter cover on the meter body, and such that the same electromagnetic connection is broken by the removal of the dielectric cover from the meter body.

* * * * *